(12) United States Patent
Braudes et al.

(10) Patent No.: US 8,804,936 B2
(45) Date of Patent: Aug. 12, 2014

(54) SHARED MEDIA ACCESS FOR REAL TIME FIRST AND THIRD PARTY MEDIA CONTROL

(75) Inventors: Robert E. Braudes, Dracut, MA (US); Joel M Ezell, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 722 days.

(21) Appl. No.: 12/574,604

(22) Filed: Oct. 6, 2009

(65) Prior Publication Data

US 2011/0081013 A1 Apr. 7, 2011

(51) Int. Cl.
*H04M 3/00* (2006.01)
*H04M 5/00* (2006.01)

(52) U.S. Cl.
USPC ........................................................ 379/243

(58) Field of Classification Search
USPC ............ 709/227–229; 370/352, 392; 379/243
See application file for complete search history.

(56) References Cited

U.S. PATENT DOCUMENTS

| | | | |
|---|---|---|---|
| 6,993,595 B1* | 1/2006 | Luptowski et al. | 709/245 |
| 2003/0028681 A1 | 2/2003 | Jain et al. | |
| 2006/0239219 A1* | 10/2006 | Haffner et al. | 370/321 |
| 2006/0272009 A1* | 11/2006 | Stott | 726/3 |

FOREIGN PATENT DOCUMENTS

EP 1198104 A2 4/2002

OTHER PUBLICATIONS

Liebhart, Manfred, "EP Application No. 10186772.9 European Search Report Feb. 3, 2011",, Publisher: EPO, Published in: EP.

\* cited by examiner

*Primary Examiner* — Duc Nguyen
*Assistant Examiner* — Sonia Gay

(57) ABSTRACT

A method comprising a data-processing system that enables one or more applications to share fewer ports by having the data-processing system request the ports, and then assign a "token" to establish a "session" to permit the one or more applications to interact with the ports.

5 Claims, 7 Drawing Sheets

SHARED MEDIA ACCESS FOR REAL TIME FIRST AND THIRD PARTY MEDIA CONTROL

FIELD OF THE INVENTION

The present invention relates to telecommunications in general, and, more particularly, to allocating communications resources.

BACKGROUND OF THE INVENTION

A telephone receiver has two parts: the microphone and the speaker. The microphone transmits and the speaker receives.

In a telecommunications network, a data-processing system, such as a telephone switch allocates or connects "ports" for this transmission and reception.

For the purpose of this specification, the term "port" is defined as a data connection that can be used by programs to exchange data directly, instead of going through a file or other temporary storage location. The most common of these are Transfer Control Protocol (TCP) and User Datagram Protocol (UDP) ports which are used to exchange data between computers on the Internet.

Additionally, a port may also have additional resources associated with it. Some of these additional resources comprise, for example, and without limitation, media processing resources such as Automated Speech Recognition, Text-to-Speech conversion, codec conversion, etc.

In establishing a communications channel between the caller and the person, a server, switch, etc. must allocate or connect at least two ports for this communications channel.

Applications may need to provide, for example, voice, video, text, etc. on the same communications channel that the caller is communicating on. When an application needs to provide, for example, an automated voice message on the same communications channel, the server, switch, etc. must allocate two additional ports for this application to provide the automated voice message to the caller. On the other hand, if another application needs to provide another automated voice message, the server, switch, etc. must allocate a third pair of ports, a fourth pair of ports, a fifth pair of ports, etc. for the applications to provide the additional automated voice messages.

One instance in which applications run along a voice call is when using a pre-paid telephone calling card. When a caller is using a pre-paid phone card to call someone, an application may need to provide an automated voice message to notifying the caller that the available time he has remaining on his pre-paid phone card has reached a certain limit (e.g., five minutes or one minute remaining on his pre-paid phone card before the call is disconnected). In this example, the application must contact a server to allocate a third port and a fourth port so that the automated message can be transmitted to the caller.

This current method and system for allocating communications resources is inefficient because servers, switches, etc. have a finite number of ports. By consuming the third port and the fourth port for the automated voice message in this example, other applications cannot use the third port and the fourth port until the application releases the ports.

In the prior art, the problem of finite resources was often solved by the purchase of additional servers, switches, etc. to add additional communications resources—in other words, to increase the number of ports that an application can allocate. However, this is costly.

Therefore, there exists a need for a method and system that can effectively allocate communications resources and, a method and system that can reduce the number of communications resources consumed by an application.

SUMMARY OF THE INVENTION

The present invention provides a method for allocating ports without some of costs the disadvantages of the prior art. This is done by introducing a data-processing system that enables one or more applications to share fewer ports. In accordance with the illustrative embodiment of the present invention, this is done by having the data-processing system request the ports, and then establish a "session" to assign a "token" to permit the application to interact with the ports.

For the purpose of this specification, the term "session" is defined as a semi-permanent interactive information interchange, between two or more telecommunications terminals or between a computer and user.

For the purpose of this specification, the term "token" is defined as a unique identifier which is generated and sent from a server to a software client to:
  i. identify a session between an application and a data-processing system, and
  ii. provide information to other applications regarding how to access the data-processing system.

This data-processing system acts as an "intermediary" allowing one application to use certain ports at certain times and allows other applications to use those same ports at other times, with all applications sharing the same communications session. This means that fewer ports must be allocated, and fewer expensive switches need be purchased.

DETAILED DESCRIPTION

Figure 1:
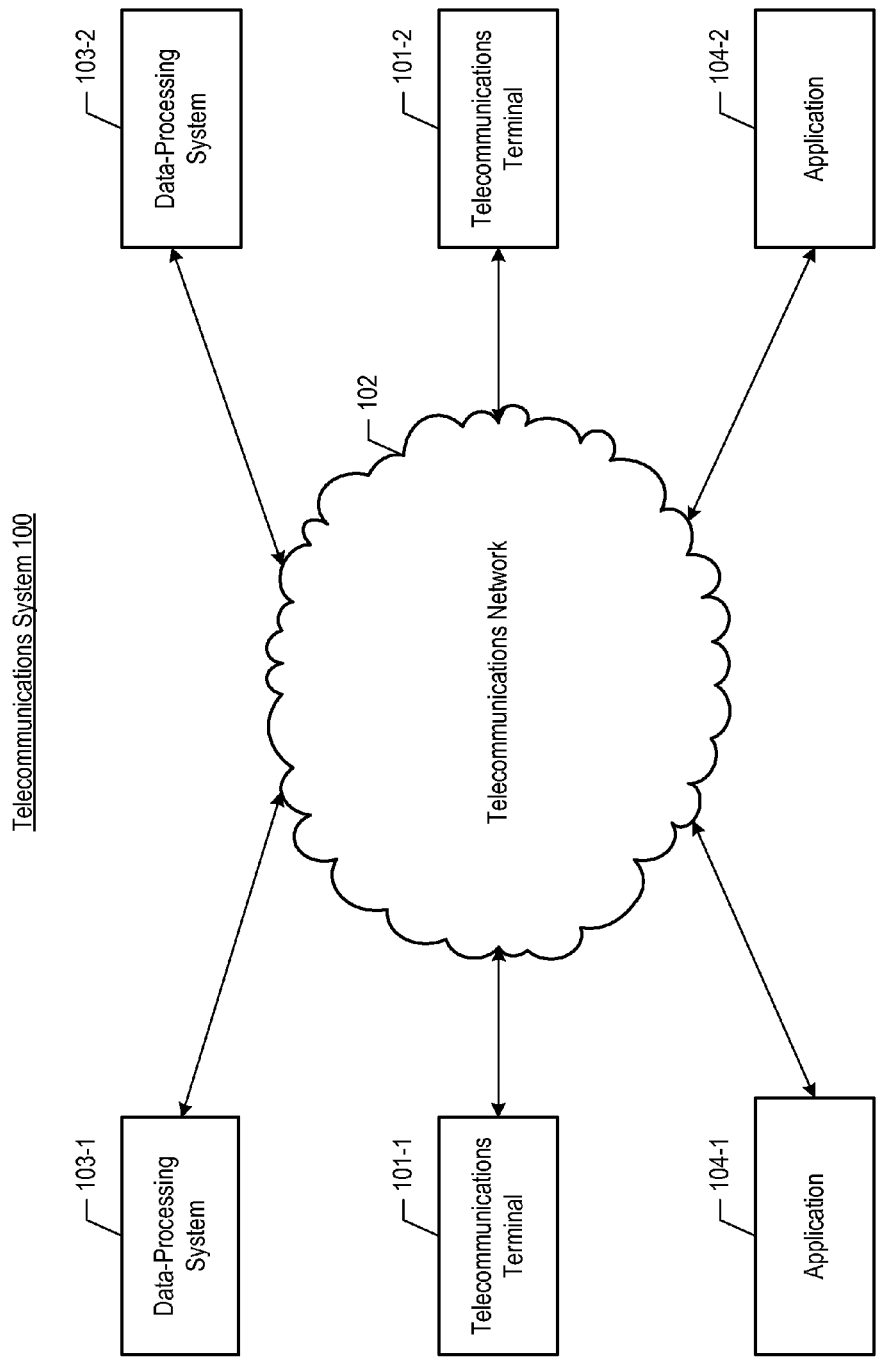
FIG. 1 depicts a schematic diagram of the salient components of telecommunications systems 100 of the prior art.

FIG. 1 depicts a schematic diagram of a portion of telecommunications system 100 in accordance with the prior art. Telecommunications system 100 comprises telecommunications terminal 101-1, telecommunications terminal 101-2, telecommunications network 102, and data-processing system 103-1, data-processing system 103-2, application 104-1, and application 104-2.

Telecommunications network 100 comprises two (2) telecommunications terminals—telecommunications terminal 101-1 and telecommunications terminal 101-2, which are, for example, wireless telecommunications terminals (e.g., a cell phone, a personal digital assistant, a smart-phone, etc.) or wireline telecommunications terminals (e.g., an office deskset, a desktop, a computer, etc.)

Telecommunications network 100 comprises one (1) telecommunications network 102 such as, the Public Switched Telephone Network (PSTN) or the Internet.

Telecommunications network 100 comprises two (2) data processing systems—data-processing system 103-1 and data-processing system 103-2, which comprises the hardware and software that enables it to distribute data across telecommunications network 102. It will be clear to one skilled in the art, after reading this disclosure, how to make and use data-processing system 103-1 and data-processing system 103-2.

Telecommunications network 100 comprises two (2) applications—application 104-1 and application 104-2 that provide, for example, and without limitation:
  i. voice, or
  ii. text, or
  iii. video, or
  iv. any combination of i, ii, and iii.

The above list of media provided by application 104-1 and application 104-2 should not be construed as being restrictive or an exhaustive enumeration of the various forms of media. Instead, other types of media can be provided by application 104-1 and application 104-2 in the list above without departing from the scope of the present invention. In any case, it will be clear to those skilled in the art, after reading this disclosure, how to make and use application 104-1 and application 104-2.

Figure 2:
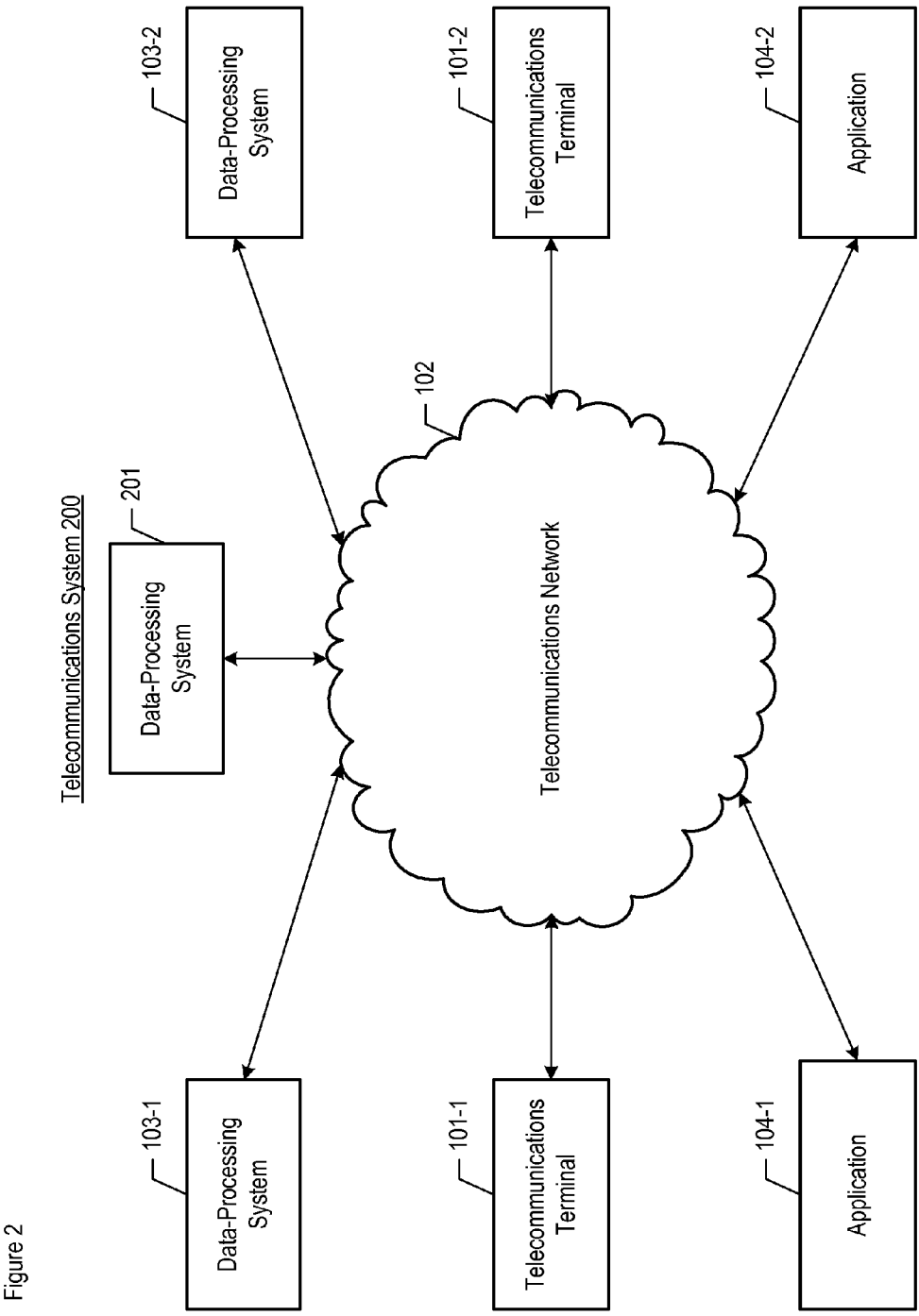
FIG. 2 depicts a schematic diagram of the salient components of telecommunications systems 100 in accordance with the illustrative embodiment of the present invention.

FIG. 2 depicts a schematic diagram of a portion of telecommunications system 200 in accordance with the illustrative embodiment of the present invention. Telecommunications system 200 comprises telecommunications terminal 101-1, telecommunications terminal 101-2, telecommunications network 102, data-processing system 103-1, data-processing system 103-2, application 104-1, application 104-2, and data-processing system 201.

Although telecommunications network 200 comprises two (2) telecommunications terminals—telecommunications terminal 101-1 and telecommunications terminal 101-2, it will be clear to one skilled in the art, after reading this disclosure how to make and use alternative embodiments of the present invention in which there are any number of telecommunications terminals (e.g., three telecommunications terminal, four telecommunications terminals, five telecommunications terminals, etc.)

Although telecommunications network 200 comprises one (1) telecommunications network 102, it will be clear to one skilled in the art, after reading this disclosure how to make and use alternative embodiments of the present invention in which there are any number and combination of telecommunications networks.

Although telecommunications network 200 comprises three (3) data-processing systems—data-processing system 103-1, data-processing system 103-2, and data-processing system 201, it will be clear to one skilled in the art, after reading this disclosure, how to make and use alternative embodiments of the present invention that comprises any number and combination of data-processing systems.

Although telecommunications network 200 comprises two (2) applications—application 104-1 and application 104-2, it will be clear to one skilled in the art, after reading this disclosure, how to make and use alternative embodiments of the present invention in which there are any number of applications (e.g., three applications, four applications, five applications, etc.)

Telecommunications terminal 101-1 and telecommunications terminal 101-2 comprises hardware and software that enables a caller to contact and interact with:
  i. data-processing system 103-1, or
  ii. data-processing system 103-2, or
  iii. data-processing system 201, or
  iv. application 104-1, or
  v. application 104-2, or
  vi. one another, or
  vii. any combination of i, ii, iii, iv, v, and vi
through telecommunications network 102.

In accordance with the illustrative embodiment, telecommunications terminal 101-1 and telecommunications terminal 101-2 are wireless telecommunications terminals (e.g., a cell phone, a personal digital assistant, a smart-phone, etc.), but it will be clear to those skilled in the art, after reading this disclosure, how to make and use alternative embodiments of the present invention in which some or all of the telecommunications terminals connect to telecommunications network 102 via a wireline telecommunications terminal (e.g., an office deskset, a desktop, a computer, etc.)

Additionally, it will be clear to those skilled in the art, after reading this disclosure, how to make and use alternative embodiments of the present invention in which telecommunications terminal 101-1 and telecommunications terminal 101-2 enables a caller to contact and interact with:
  i. data-processing system 103-1, or
  ii. data-processing system 103-2, or
  iii. data-processing system 201, or
  iv. application 104-1, or
  v. application 104-2, or
  vi. one another, or
  vii. any combination of i, ii, iii, iv, v, and vi
via a different modality, for example, and without limitation, web requests, e-mail, instant messaging, short-message service, video, voice, etc. In any case, it will be clear to those skilled in the art, after reading this disclosure, how to make and use telecommunications terminal 101-1 and telecommunications terminal 101-2.

Telecommunications network 102 is a private network, but it will be clear to those skilled in the art, after reading this disclosure, how to make and use alternative embodiments of the present invention in which telecommunication network 102 is another network or a combination of networks, for example, and without limitation, the Public Switched Telephone Network (PSTN), Public Land Mobile Network (PLMN), the Internet, a private data network, a community access television network, a cable television system, a fiber optic data network, a satellite network, etc.

Data-processing system 103-1 comprises hardware and software that enables it to, for example, and without limitation:
  i. receive a call from telecommunications terminal 101-1, or
  ii. receive a call from telecommunications terminal 101-2, or
  iii. transmit a call to telecommunications terminal 101-1, or
  iv. transmit a call to telecommunications terminal 101-2, or
  v. transmit a signal to invoke application 104-1, or
  vi. transmit a signal to invoke application 104-2, or
  vii. receive a signal from application 104-1, or
  viii. receive a signal from application 104-2, or ix. establish a connection between telecommunications terminal 101-1 and telecommunications terminal 101-2 so that both telecommunications terminal can exchange data, or x. determine that an application is associated with telecommunications terminal 101-1, or xi. determine that an application is associated with telecommunications terminal 101-2, or xii. any combination of i, ii, iii, iv, v, vi, vii, viii, ix, x, and xi.

In particular, data-processing system 103-1 is capable of performing the tasks described below and in the accompanying figures.

Data-processing system 103-2 comprises hardware and software that enables it to, for example, and without limitation:

i. receive a signal from data-processing system 201, or ii. transmit a signal to data-processing system 201, or iii. allocate one or more communications resources (e.g., one or more ports), or iv. transmit a signal to data-processing system 201 that comprises the parameters for the one or more communications resources (e.g., the parameters associated with the one or more ports), or v. establish a connection with telecommunications terminal 101-1 based, at least in part, on the allocated ports, or vi. establish a connection with telecommunications terminal 101-2 based, at least in part, on the allocated ports, or vii. establish a connection with other telecommunications terminals based, at least in part, on the allocated ports, or viii. convert one or more media into various formats, or ix. any combination of i, ii, iii, iv, v, vi, vii, and viii.

In particular, data-processing system 103-2 is capable of performing the tasks described below and in the accompanying figures.

Data-processing system 201 comprises hardware and software that enables it to, for example, and without limitation:

i. receive a signal from application 104-1 to allocate one or more communications resources (e.g., one or more ports), or ii. receive a signal from application 104-2 to allocate one or more communications resources (e.g., one or more ports), or iii. transmit a signal to data-processing system 103-2 to allocate one or more communications resources (e.g., one or more ports) based, at least in part, on the signal received from application 104-1, or iv. transmit a signal to data-processing system 103-2 to allocate one or more communications resources (e.g., one or more ports) based, at least in part, on the signal received from application 104-2, or v. receive a signal from data-processing system 103-2 that comprises the parameters for the one or more communications resources (e.g., the parameters associated with the one or more ports allocated by data-processing system 103-2), or vi. allocate one or more tokens based, at least in part, on the signal received from data-processing system 103-2, or vii. associating a token with the parameters associated with the allocated one or more ports (e.g., encapsulating the media state of a call between telecommunications terminal 101-1 and telecommunications terminal 101-2), or viii. transmit a signal to application 104-1 that comprises a token associated with the parameters of the allocated communications resources (e.g., the parameters associated with the one or more ports allocated by data-processing system 103-2), or ix. transmit a signal to application 104-2 that comprises a token associated with the parameters of the allocated communications resources (e.g., the parameters associated with the one or more ports allocated by data-processing system 103-2), or x. receive a signal from application 104-1 to perform an operation based, at least in part, on the communications resources allocated by data-processing system 103-2, or xi. receive a signal from application 104-2 to perform an operation based, at least in part, on the communications resources allocated by data-processing system 103-2, or xii. transmit the signal from application 104-1 to telecommunications terminal 103-2, or xiii. transmit the signal from application 104-2 to telecommunications terminal 103-2, or xiv. any combination of i, ii, iii, iv, v, vi, vii, viii, ix, x, xi, xii, and xiii.

In particular, data-processing system 201 is capable of performing the tasks described below and in the accompanying figures.

Application 104-1 and application 104-1 is software for communicating and interacting with telecommunications terminal 101-1, telecommunications terminal 101-2, data-processing system 103-1, data-processing system 103-2, and data-processing system 201 through telecommunications network 102.

In accordance with the illustrative embodiment, application 104-1 and application 104-2, which when executed by a processor (e.g., a computer processor, a general purpose processor, a special purpose processor, etc.), can request that data-processing system 201 and data-processing system 103-2 distribute, for example, and without limitation:

i. voice across telecommunications network 102 (e.g., automated voice messages, interactive voice responses (IVR), voice-over IP (VoIP), generate a dual tone multi-frequency (DTMF) tone, etc.), or ii. text across telecommunications network 102 (e.g., short-message services, e-mails, instant messages, etc.), or iii. video across telecommunications network 102, or iv. any combination of i, ii, and iii on the same communications channel but it will be clear to those skilled in the art, after reading this disclosure, how to make and use alternative embodiments of the present invention in which the application 104-1 and application 104-2 can distribute the voice, text, video, etc. on a separate communications channel.

It will be clear to those skilled in the art that the above list of media provided by application 104-1 and application 104-2 should not be construed as being restrictive or an exhaustive enumeration of the various forms of media. Instead, other types of media can be provided by application 104-1 and application 104-2 in the list above without departing from the scope of the present invention.

Additionally and in accordance with the illustrative embodiment, application 104-1 and application 104-2 are stored and/or executed from hardware that is separate from data-processing system 103-1, data-processing system 103-2, and data-processing system 201, but it will be clear to those skilled in the art, after reading this disclosure, how to make and use alternative embodiments of the present invention in which application 104-1 and application 104-2 are stored and/or executed from, for example, and without limitation, data-processing system 103-1, data-processing system 103-

2, data-processing system 201, telecommunications terminal 101-1, telecommunications terminal 101-2, etc.

Additionally, it will be clear to those skilled in the art, after reading this disclosure, how to make and use alternative embodiments of the present invention in which application 104-1 and application 104-2 are stored and/or executed on the same hardware.

Additionally, it will be clear to those skilled in the art, after reading this disclosure, how to make and use alternative embodiments of the present invention in which there are any number of applications.

Figure 3:
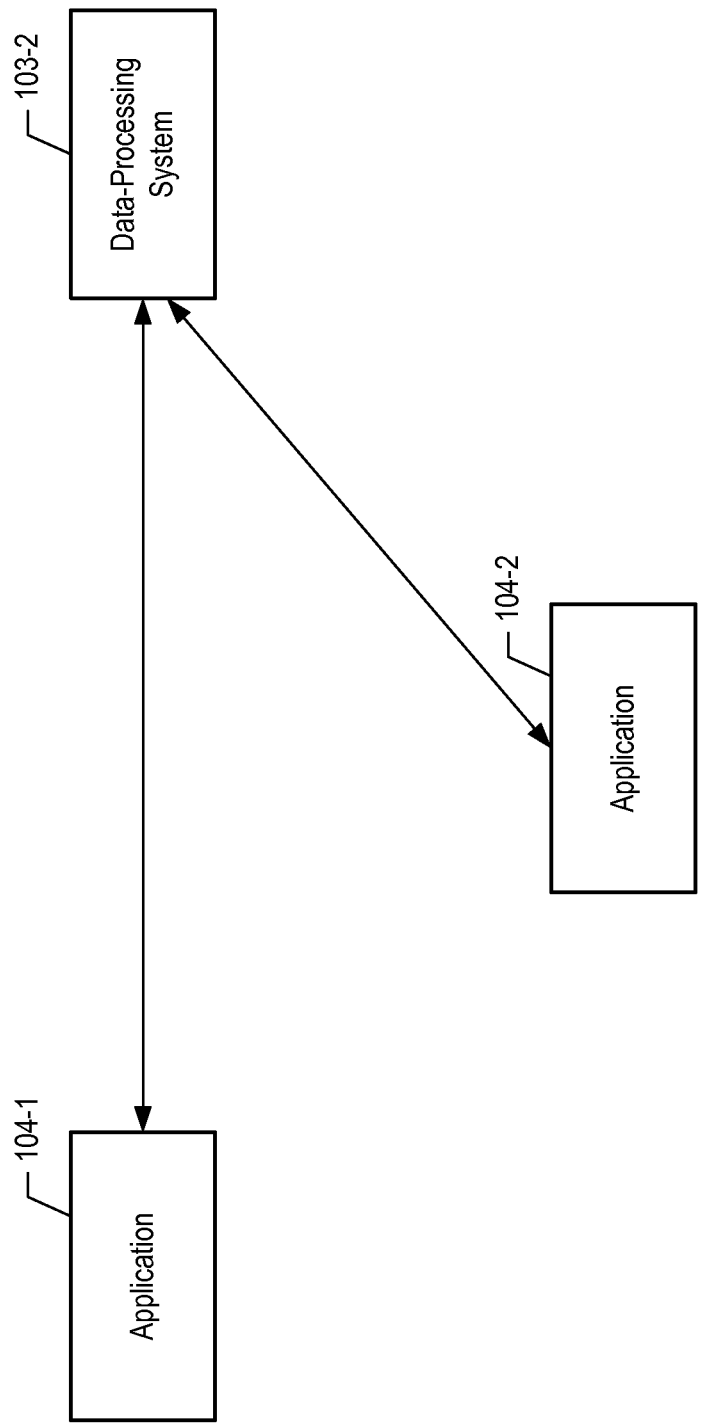
FIG. 3 depicts the salient tasks associated with the operation of telecommunications system 100 for requesting communications resources.

FIG. 3 depicts a schematic diagram of a portion of telecommunications system 100 in accordance with the prior art. FIG. 3 comprises data-processing system 103-2, application 104-1, and application 104-2 interconnected as shown.

For the sake of simplicity, the schematic diagram illustrating a portion of telecommunications system 100 in accordance with the prior art comprises two (2) applications— applications 104-1 and application 104-2, but it will be clear to those skilled in the art, after reading this disclosure, how to make and use alternative embodiments of the present invention in which there are any number of applications.

In accordance with FIG. 3, upon receiving a call from telecommunications terminal 101-1, data-processing system 103-1 invokes application 104-1. Application 104-1 transmits a signal to data-processing system 103-2 to allocate one or more communications resources (e.g., one or more ports). In particular, the signal transmitted from application 104-1 is a request for two ports from data-processing system 103-2.

Additionally, data-processing system 103-1 invokes application 104-2 upon receiving the call from telecommunications terminal 101-1. Application 104-2 transmits a signal to data-processing system 103-2 to allocate one or more communications resources (e.g., one or more ports). In particular, the signal transmitted from application 104-2 is a request for an additional two ports from data-processing system 103-2.

This method and system for allocating ports in the prior art is inefficient because a total of six ports are allocated for one call. In other words, i. one port on telecommunications terminal 101-1 and another port on data-processing system 103-2 for the data hop between telecommunications terminal 101-1 and application 104-1,
ii. one port on telecommunications terminal 101-2 and another port on data-processing system 103-2 for the data hop between telecommunications terminal 101-2 and application 104-2, and
iii. two ports on data-processing system 103-2 for the data hop between application 104-1 and application 104-2, which in total is six ports for one call.

Figure 4:
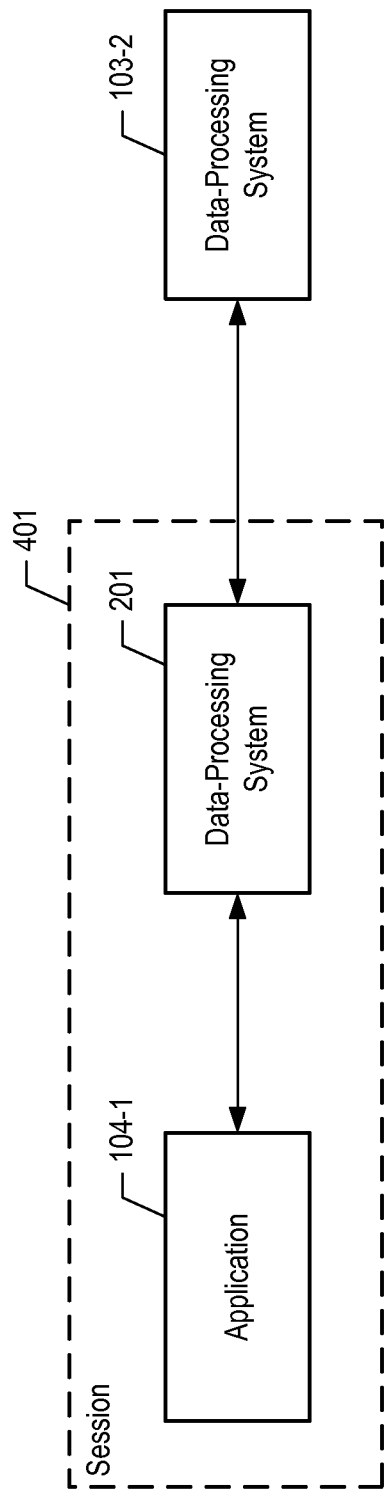
FIG. 4 depicts a schematic diagram of a portion of telecommunications system 200 in accordance with the illustrative embodiment of the present invention.

FIG. 4 depicts a schematic diagram of a portion of telecommunications system 200 in accordance with the illustrative embodiment of the present invention. FIG. 4 comprises data-processing system 103-2, application 104-1, data-processing system 201, and session 401.

In accordance with the illustrative embodiment, telecommunications system 200 comprises one (1) session 401, but it will be clear to those skilled in the art, after reading this disclosure, how to make and use alternative embodiments of the present invention in which there are any number of sessions (e.g., two sessions, three sessions, four sessions, etc.)

In accordance with the illustrative embodiment, session 401 is between application 104-1 and data-processing system 201, but it will be clear to those skilled in the art, after reading this disclosure, how to make and use alternative embodiments of the present invention in which session 401 may comprise any other hardware and/or software.

In accordance with the illustrative embodiment, session 401 comprises one data-processing system 201, but it will be clear to those skilled in the art, after reading this disclosure, how to make and use alternative embodiments of the present invention in which session 401 may comprise any number of data-processing systems 201.

In accordance with FIG. 4, upon receiving a call from telecommunications terminal 101-1, data-processing system 103-1 invokes application 104-1. In session 401, application 104-1 transmits a signal to data-processing system 201 to allocate one or more communications resources (e.g., one or more ports). In particular, the signal transmitted from application 104-1 during session 401 is requesting that data-processing system 201 allocate two ports from data-processing system 103-2.

In other words, data-processing system 201 is an intermediary hardware and/or software between application 104-1 and data-processing system 103-2. By being an intermediary, all requests from any application for communications resources (e.g., the request for two ports from application 104-1) is mediated by data-processing system 201, and therefore, communications resources are efficiently utilized.

Data-processing system 201 transmits a signal to data-processing system 103-2 to allocate two ports for application 104-1. Once data-processing system 103-2 allocates two ports, one or more parameters (i.e., a set of permissions and/or information pertaining to the communications resources for enabling the application 104-1 to use the two allocated ports) associated with the two ports are transmitted from data-processing system 103-2 to data-processing system 201.

When data-processing system 201 receives the one or more parameters, data-processing system 201 allocates a token and associates the token with the received parameters. More particularly, the token allocated by data-processing system 201 encapsulates the media state of the call in which the data associated with the token can be updated during the lifetime of the communications session. This token will be used by the data-processing system 201 to determine whether ports have already been allocated for subsequent applications that are requesting for ports. Alternatively, the presence of the token may be detected directly by another application requesting for communications resources (e.g., application 104-2) at which point the other application would not request for additional communications resources (e.g., two additional ports), which will be described in detail below and with respect to FIG. 5.

The method and system of the present invention is advantageous because the number of ports allocated for application 104-1 and other applications (e.g., application 104-2) is less than six ports, which will be described in detail below and with respect to FIG. 5.

Figure 5:
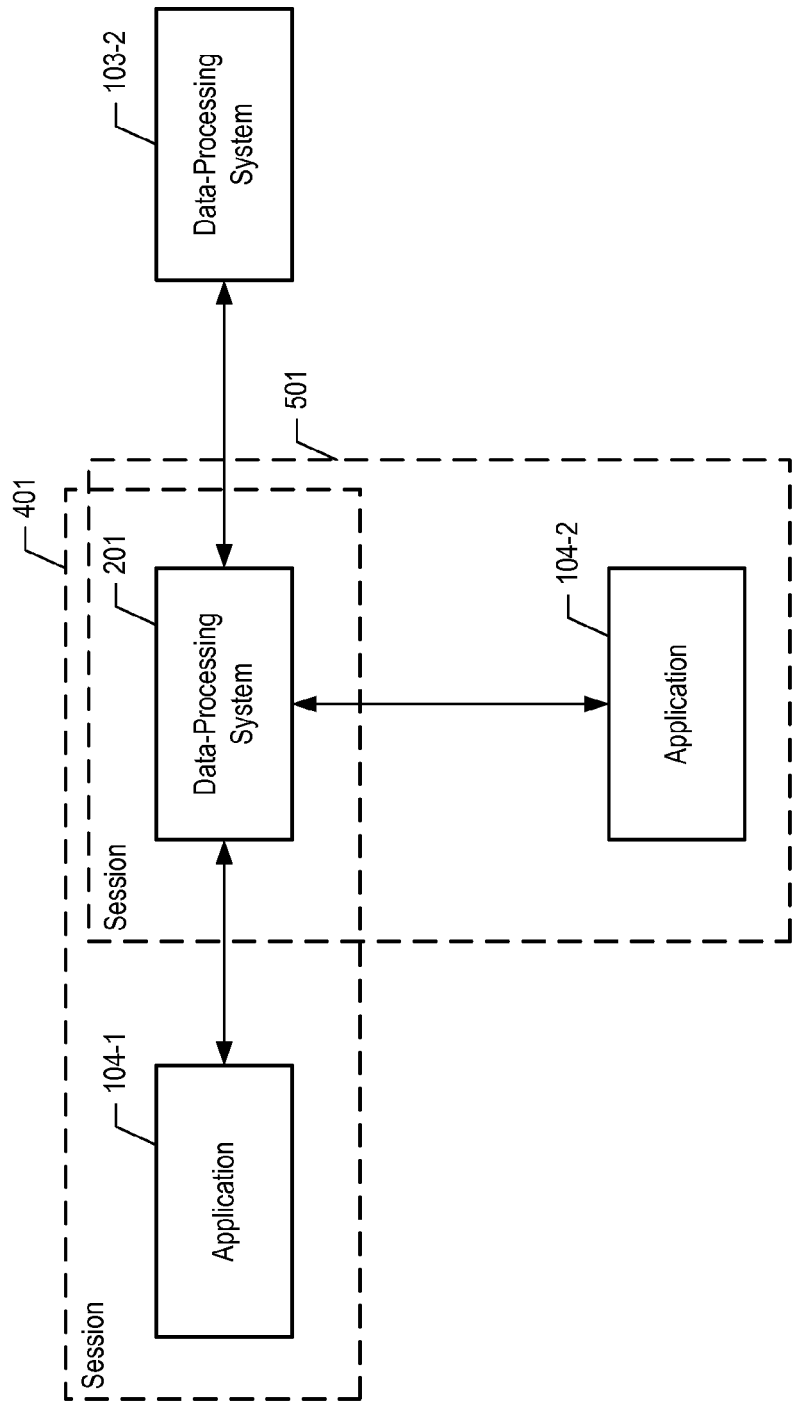
FIG. 5 depicts a schematic diagram of a portion of telecommunications system 200 in accordance with the illustrative embodiment of the present invention.

FIG. 5 depicts a schematic diagram of a portion of telecommunications system 200 in accordance with the illustrative embodiment of the present invention. FIG. 5 comprises data-processing system 103-2, application 104-1, application 104-2, data-processing system 201, session 401, and session 501.

In accordance with the illustrative embodiment, telecommunications system 200 comprises two (2) sessions—session 401 and session 501, but it will be clear to one skilled in the art, after reading this disclosure, how to make and use alternative embodiments of the present invention in which there are any number of sessions (e.g., three sessions, four sessions, five sessions, etc.)

In accordance with the illustrative embodiment, session 501 is between application 104-2 and data-processing system 201, but it will be clear to those skilled in the art, after reading this disclosure, how to make and use alternative embodiments of the present invention in which session 501 may comprise any other hardware and/or software.

In accordance with the illustrative embodiment, session 501 comprises one data-processing system 201, but it will be clear to one skilled in the art, after reading this disclosure, how to make and use alternative embodiments of the present invention in which session 501 comprises any number of data-processing systems 201.

In accordance with FIG. 5, upon receiving a call from telecommunications terminal 101-1, data-processing system 103-1 determines from the call that application 104-2 should be invoked. In session 501, data-processing system 103-1 invokes application 104-2 by transmitting a signal that includes the token with the parameters. Once application 104-2 is invoked, a signal is transmitted to data-processing system 201, which also includes the token and the received parameters, to allocate one or more communications resources (e.g., one or more additional ports). In particular, the signal transmitted from application 104-2 during session 501 is requesting that data-processing system 201 allocate two additional ports from data-processing system 103-2.

Once the data-processing system 201 receives the signal from application 104-2, data-processing system 201 detects that the signal includes the token with the parameters associated with the two ports allocated to application 104-1. Since the data-processing system 201 detects the token, no ports are allocated to application 104-2. Instead, data-processing system 201 updates the information stored in the token, if necessary, and transmits the token and the updated information back to application 104-2.

It will be clear to those skilled in the art, after reading this disclosure, how to make and use alternative embodiments of the present invention in which the presence of the token can be detected directly by application 104-2, at which point application 104-2 would not request for two additional ports since two ports have already been allocated to application 104-1.

This method and system for allocating ports in the present invention is advantageous because a total of four ports are allocated for one call. In other words,
 i. one port on telecommunications terminal 101-1 and another port on data-processing system 103-2 for the data hop between telecommunications terminal 101-1 and both application 104-1 and application 104-2, and
 ii. one port on data-processing system 103-2 and another port on telecommunications 101-2 for the data hop between both applications 104-1 and applications 104-2,
which in total is four ports for one call in the present invention.

Additionally, this method and system for allocating ports is advantageous because additional applications, such as application 104-2, invoked by data-processing system 103-1 do not need to request for additional communications resources. Instead, application 104-2 shares the two ports that were initially allocated to application 104-1. This is advantageous over current methods and systems for allocating ports since a total of four ports are allocated by the present invention for two applications, whereas a total of six ports are allocated for two applications in current methods and systems.

Figure 6:
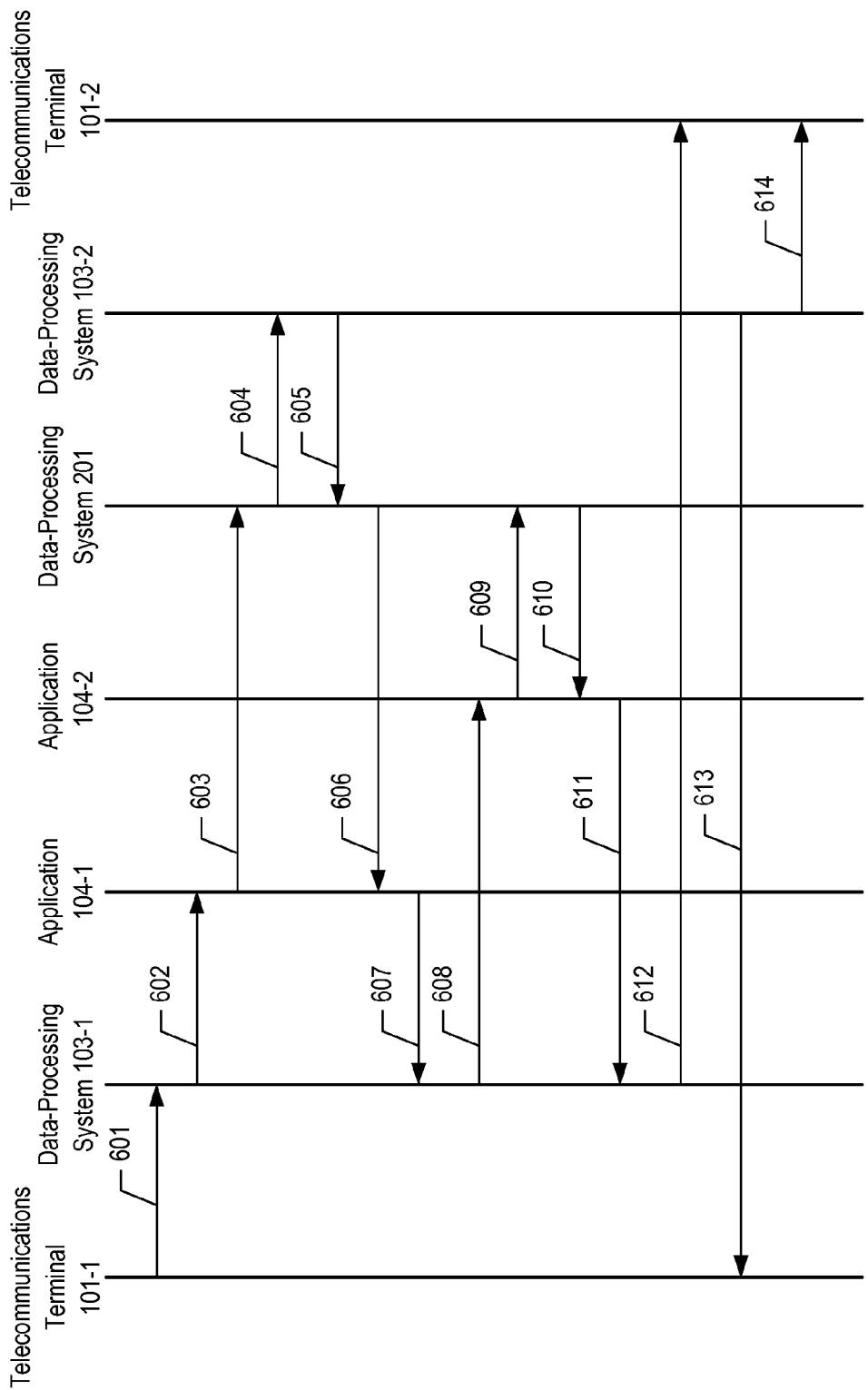
FIG. 6 depicts a communications flow associated with telecommunications system 200 for requesting communications resources in accordance with the illustrative embodiment.

FIG. 6 depicts a communications flow associated with telecommunications system 200 for requesting communications resources in accordance with the illustrative embodiment of the present invention.

At task 601, a caller at telecommunications terminal 101-1 transmits a signal to data-processing system 103-1 to establish a communications session with telecommunications terminal 101-2.

In accordance with the illustrative embodiment, the communications session between telecommunications terminal 101-1 and telecommunications terminal 101-2 is, for example, and without limitation:
 i. a voice communications session, or
 ii. a video communications session, or
 iii. a text communications session, or
 iv. any combination of i, ii, and iii.

It will be clear to those skilled in the art that the above list of media provided by application 104-1 and application 104-2 should not be construed as being restrictive or an exhaustive enumeration of the various forms of media. Instead, other types of media can be provided by application 104-1 and application 104-2 in the list above without departing from the scope of the present invention.

Additionally, it will be clear to those skilled in the art, after reading this disclosure, how to make and use alternative embodiments of the present invention in which telecommunications terminal 101-1 can establish a communications session with, for example, and without limitation, two or more communications session at the same time.

Additionally, it will be clear to those skilled in the art, after reading this disclosure, how to make and use alternative embodiments of the present invention in which more than one application is invoked during each communications session established by telecommunications terminal 101-1—that is, more than one application could be invoked during the communications session between telecommunications terminal 101-1 and telecommunications terminal 101-2.

At task 602, data-processing system 103-1 receives the call and determines that application 104-1 is associated with the caller and/or telecommunications terminal 101-1. In other words, whenever the caller at telecommunications terminal 101-1 places a call to another telecommunications terminal (e.g., telecommunications terminal 101-2 in the illustrative embodiment), the data-processing system 103-1 comprises the hardware and software to enable it to detect and determine that the call received from telecommunications terminal 101-1 is associated with application 104-1.

Since the data-processing system 103-1 determines that application 104-1 is associated with the telecommunications terminal 101-1 upon receiving the call, the data-processing system 103-1 transmits a signal to application 104-1.

In accordance with the illustrative embodiment, data-processing system 103-1 determines that only one application (i.e., application 104-1) should be invoked upon receiving the call from telecommunications terminal 101-1, but it will be clear to those skilled in the art, after reading this disclosure, how to make and use alternative embodiments of the present invention in which the data-processing system 103-1 determines that more than one application should be invoked based, at least in part, on the number of applications associated with the caller and/or the telecommunications terminal 101-1.

Additionally and in accordance with the illustrative embodiment, application 104-1 is an application that records the conversation between the caller at telecommunications terminal 101-1 and the person at telecommunications terminal 101-2, but it will be clear to those skilled in the art, after reading this disclosure, how to make and use alternative embodiments of the present invention in which application 104-1 comprises, for example, and without limitation:
 i. a voice application, or
 ii. a video application, or
 iii. a text application, or
 iv. any combination of i, ii, and iii.

It will be clear to those skilled in the art that the above list of media provided by application 104-1 and application 104-2 should not be construed as being restrictive or an exhaustive enumeration of the various forms of media.

Instead, other types of media can be provided by application 104-1 and application 104-2 in the list above without departing from the scope of the present invention.

At task 603, application 104-1 receives the signal from data-processing system 103-1 (i.e., application 104-1 is invoked by data-processing system 103-1) and transmits a signal to data-processing system 201 to allocate two ports. In other words, the signal transmitted from application 104-1 is requesting that data-processing system 201 allocate two ports (i.e., communications resources) that are not used by, or, allocated to telecommunications terminal 101-1, telecommunications 101-2, other telecommunications terminals, or other applications.

Although two ports are allocated at task 603, it will be clear to those skilled in the art, after reading this disclosure, how to make and use alternative embodiments of the present invention, in which the signal, for example, and without limitation, is a request for another type of communications resource.

Additionally, it will be clear to those skilled in the art, after reading this disclosure, how to make and use alternative embodiments of the present invention in which the signal transmitted from application 104-1 to data-processing system 201 is a request for data-processing system 201 to allocate more than two ports, less than two ports, or any number of ports, for example, and without limitation, one port, three ports, four ports, five ports, etc.

At task 604 and upon receiving the signal from application 104-1, the data-processing system 201 transmits a signal to data-processing system 103-2 to allocate two ports.

At task 605, the data-processing system 103-2 receives the signal from data-processing system 201 and allocates two ports. Once the ports are allocated by data-processing system 103-2, a signal is transmitted from data-processing system 103-2 to data-processing system 201 that comprises the parameters associated with the two allocated ports. In other words, these parameters comprise a set of permissions and/or information pertaining to the communications resource for enabling the application 104-1 to use the two ports allocated by the data-processing system 103-2.

At task 606, the data-processing system 201 receives the signal from data-processing system 103-2, which comprises the parameters for the two allocated ports at task 605. The data-processing system 201 allocates a token and associates (e.g., encapsulates the media state of the call) the token with the parameters of the two allocated ports.

Once the data-processing system 201 allocates the token, the data-processing system 201 transmits a signal to application 104-1, wherein the signal comprises:
  i. the parameters associated with the two allocated ports (i.e., the set of permissions and/or information pertaining to the communications resources for enabling the application 104-1 to use the two ports allocated by data-processing system 103-2), and
  ii. the token that is associated with the parameters of the two allocated ports.

In accordance with the illustrative embodiment, the signal transmitted from data-processing system 201 to application 104-1 indicates that the parameters associated with the two allocated ports have been received from data-processing system 103-2 and that the token is associated with the parameters of the two allocated ports, but it will be clear to those skilled in the art, after reading this disclosure, how to make and use alternative embodiments of the present invention in which the signal transmitted from data-processing system 201 to application 104-1 can comprises other data.

Additionally and in accordance with the illustrative embodiment, the parameters associated with the two allocated ports are encapsulated in the token and transmitted from the data-processing system 201 to application 104-1 as one signal, but it will be clear to those skilled in the art, after reading this disclosure, how to make and use alternative embodiments of the present invention in which the parameters associated with the two allocated ports are not encapsulated in the token and are transmitted separately from the data-processing system 201 to the application 104-1.

At task 607, the signal received at application 104-1 from data-processing system 201 (i.e., the token and the parameters associated with the two allocated ports) is transmitted to data-processing system 103-1. The signal notifies the data-processing system 103-1 that the two ports are allocated for application 104-1 and a token is associated with the parameters of the two allocated ports. Additionally, the signal notifies data-processing system 103-1 that application 104-1 has completed its current processing requirements and is ready for the call to proceed.

At task 608, data-processing system 103-1 receives the signal from application 104-1 and determines that application 104-2 is associated with telecommunications terminal 101-2. In other words, whenever an incoming call is directed to telecommunications terminal 101-2, the data-processing system 103-1 comprises the hardware and software to enable it to detect and determine that application 104-2 should be invoked.

Since the data-processing system 103-1 determines that application 104-2 is associated with the telecommunications terminal 101-2, the data-processing system 103-1 transmits a signal to application 104-2.

In accordance with the illustrative embodiment of the present invention, the signal transmitted from the data-processing system 103-1 to application 104-2 comprises the token associated with the parameters of the two ports allocated to application 104-1, but it will be clear to those skilled in the art, after reading this disclosure, how to make and use alternative embodiments of the present invention in which the token can be transmitted from the data-processing system 103-1 to application 104-2 in a separate signal.

Additionally, it will be clear to those skilled in the art, after reading this disclosure, how to make and use alternative embodiments of the present invention in which the signal transmitted from data-processing system 103-1 to application 104-2 comprises other data.

Additionally and in accordance with the illustrative embodiment, data-processing system 103-1 determines that only one application (i.e., application 104-2) should be invoked, but it will be clear to those skilled in the art, after reading this disclosure, how to make and use alternative embodiments of the present invention in which the data-processing system 103-1 determines that more than one application should be invoked based, at least in part, on the number of applications associated with telecommunications terminal 101-2.

Additionally and in accordance with the illustrative embodiment, application 104-2 is an application that plays an automated prompt, but it will be clear to those skilled in the art, after reading this disclosure, how to make and use alternative embodiments of the present invention in which application 104-2 is, for example, and without limitation:
  i. a voice application, or
  ii. a video application, or
  iii. a text application, or
  iv. any combination of i, ii, and iii.

It will be clear to those skilled in the art that the above list of media provided by application 104-1 and application 104-2 should not be construed as being restrictive or an exhaustive enumeration of the various forms of media. Instead, other types of media can be provided by application 104-1 and application 104-2 in the list above without departing from the scope of the present invention.

Additionally, it will be clear to those skilled in the art, after reading this disclosure, how to make and use alternative embodiments of the present invention in which the flow moves to task 612 when no applications are associated with telecommunications terminal 103-2, which is described in detail below.

At task 609, application 104-2 receives the signal from data-processing system 103-1 and transmits a signal to data-processing system 201 to allocate two additional ports. In other words, the signal transmitted from application 104-2 is requesting that data-processing system 201 allocate two additional ports (i.e., communications resources) that are not used by, or, allocated to telecommunications terminal 101-1, telecommunications 101-2, other telecommunications terminals, or other applications.

In accordance with the illustrative embodiment, the signal transmitted from the application 104-2 to data-processing system 201 comprises the token associated with the parameters of the two ports allocated to application 104-1, but it will be clear to those skilled in the art, after reading this disclosure, how to make and use alternative embodiments of the present invention in which the token can be transmitted from the application 104-2 to data-processing system 201 in a separate signal.

It will be clear to those skilled in the art, after reading this disclosure, how to make and use alternative embodiments of the present invention in which the signal transmitted from application 104-2 to data-processing system 201 is a request for data-processing system 201 to allocate more than two ports or less than two ports, for example, and without limitation, one port, three ports, four ports, five ports, etc.

In accordance with an alternative embodiment, upon detecting the presence of the token by application 104-2, the application 104-2 does not transmit a signal to data-processing system 201 requesting that data-processing system 201 allocate two additional ports (e.g., communications resources) that are not used by, or, allocated to telecommunications terminal 101-1, telecommunications 101-2, other telecommunications terminals, or other applications.

Instead, when the application 104-2 detects the presence of the token, application 104-2 utilizes the two ports allocated to application 104-1 at task 605 to perform an operation associated with the application 104-2 (e.g., the communications resources allocated to application 104-1 by data-processing system 103-2 at task 605).

For example, application 104-2 is a software application that is programmed to perform an operation at a certain time when the caller at telecommunications terminal 101-1 is communicating with the person at telecommunications terminal 101-2. Some examples of the operations performed by application 104-2 comprises, but is not limited to:

i. providing an automated voice messages, or
  ii. providing an interactive voice responses (IVR), or
  iii. providing a dual tone multi-frequency (DTMF) tone, or
  iv. providing text for displaying on telecommunications terminal 101-1 and/or telecommunications terminal 101-2, or
  v. providing a video for displaying on telecommunications terminal 101-1 and/or telecommunications terminal 101-2, or
  vi. any combination of i, ii, iii, iv, and v.

When the time comes for application 104-2 to perform the operation, application 104-2 utilizes the two ports initially allocated to application 104-1 to perform the operation. This is based at least in part on the application 104-2 detecting the presence of a token in the signal transmitted by data-processing system 103-1 to application 104-2 at task 609. Thus, application 104-2 can utilize the two ports allocated to application 104-1 to inject data into the connection between telecommunications terminal 101-1 and telecommunications terminal 101-2 based, at least in part, on detecting the presence of the token.

At task 610, the data-processing system 201 receives the signal from application 104-2 which includes the token. Upon receiving the signal, data-processing system 201 detects that the signal includes the token and does not allocate two additional ports for application 104-2. Instead, data-processing system 201 updates the parameters associated with the token, if necessary, and transmits a signal that includes the updated parameters and the token back to application 104-2.

At task 611, the application 104-2 receives the signal from data-processing system 201 (i.e., the updated parameters associated with the token), and transmits a signal to data-processing system 103-1.

In accordance with the illustrative embodiment, application 104-2 is unaware of the fact that two ports have already been allocated until application 104-2 receives the signal from data-processing system 201. Application 104-2 determines that two ports have already been allocated to application 104-1 upon receiving the signal from data-processing system 201, and, therefore, reuses the two ports initially allocated to application 104-1 to perform an operation.

At task 612, the data-processing system 103-1 transmits a signal to telecommunications terminal 101-2 and the person at telecommunications terminal 101-2 accepts the call.

At task 613, a connection is established between telecommunications terminal 101-1 and data-processing system 103-2 so that the caller at telecommunications terminal 101-1 can exchange data with telecommunications terminal 101-2 through data-processing system 103-2. In other words, once the connection is established, telecommunications terminal 101-1 can communicate and interact with telecommunications terminal 101-2 by transmitting and receiving signals to and from one another.

Furthermore, at the request of application 104-1 and application 104-2, the data-processing system 103-2 comprises the hardware and software to enable it to perform an operation specified by application 104-1 and application 104-2, for example, and without limitation, record or inject data into the connection between telecommunications terminal 101-1 and telecommunications terminal 101-2.

At task 614, a connection is established between telecommunications terminal 101-2 and data-processing system 103-2 so that the caller at telecommunications terminal 101-1 can exchange data with telecommunications terminal 101-2. In other words, once the connection is established, telecommunications terminal 101-2 can communicate and interact with telecommunications terminal 101-1 by transmitting and receiving signals to and from one another.

Furthermore, at the request of application 104-1 and application 104-2, the data-processing system 103-2 comprises the hardware and software to enable it to perform an operation specified by application 104-1 and application 104-2, for example, and without limitation, record or inject data into the connection between telecommunications terminal 101-1 and telecommunications terminal 101-2.

Figure 7:
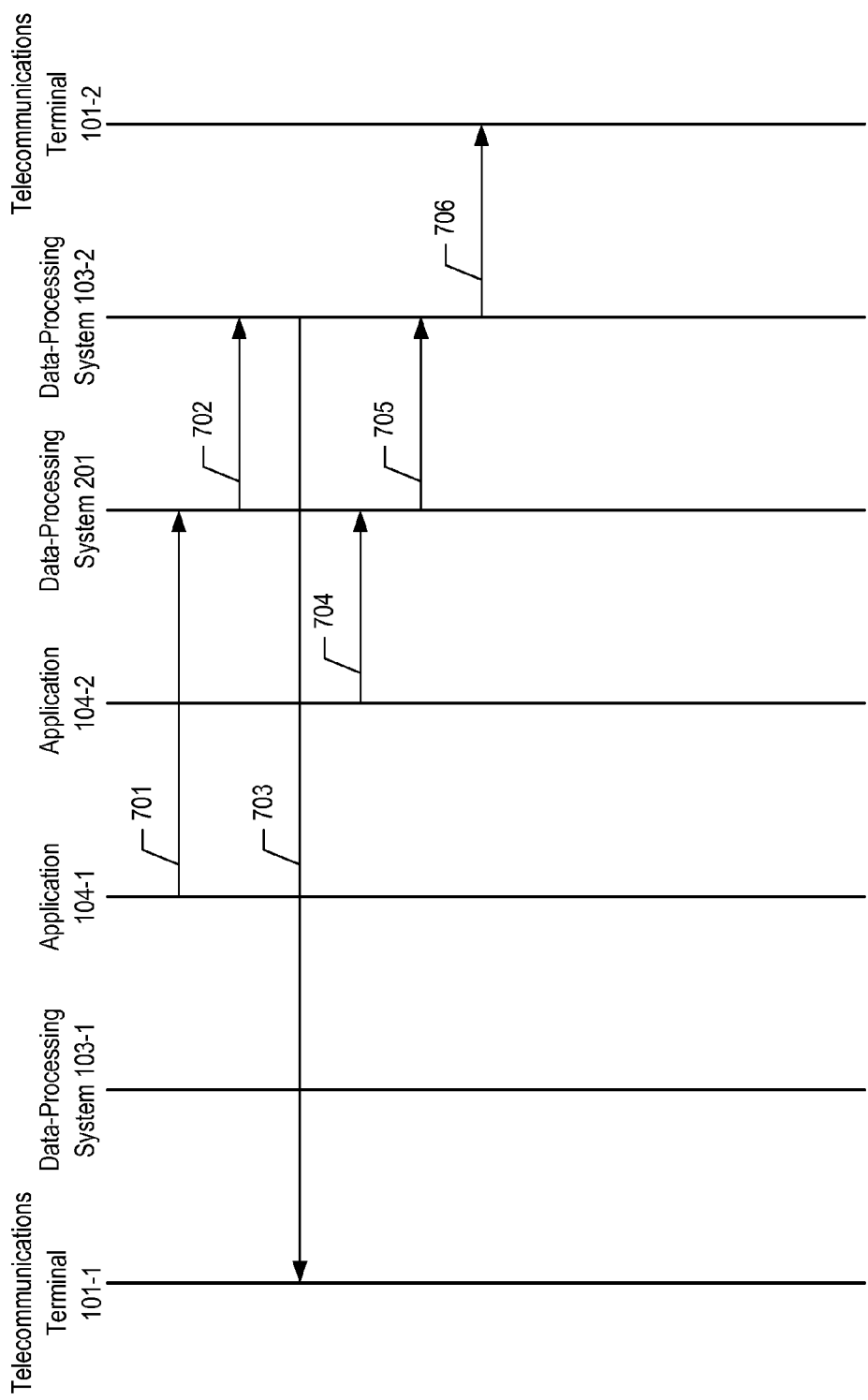
FIG. 7 depicts a communications flow of two applications performing an operation associated with telecommunications system 200 in accordance with the illustrative embodiment.

FIG. 7 depicts a communications flow of two applications performing an operation associated with telecommunications system 200 in accordance with the illustrative embodiment.

At task 701, application 104-1 is executed and a signal is transmitted from the application 104-1 to data-processing system 201. In particular, the signal from application 104-1 is a request for data-processing system 201 to perform an operation associated with application 104-1 based, at least in part, on the two ports allocated at task 605 of FIG. 6.

At task 702, data-processing system 201 transmits a signal to data-processing system 103-2 to use the two allocated ports for performing the operations of application 104-1.

At task 703, data-processing system 103-2 transmits a signal to telecommunications terminal 101-1. In particular, the signal from data-processing system 103-2 to telecommunications terminal 101-1 performs the operation associated with application 104-1, which was requested by application 104-1 at task 701. Thus, data-processing system 103-2 can inject an operation associated with application 104-1 into the connection (i.e., communications channel) between:
  i. telecommunications terminal 101-1 and data-processing system 103-2, or
  ii. telecommunications terminal 101-2 and data-processing system 103-2, or
  iii. a combination of i and ii,
utilizing the two ports allocated by data-processing system 103-2.

Similarly, at task 704, application 104-2 is executed and a signal is transmitted to data-processing system 201. In particular, the signal from application 104-2 is a request for data-processing system 201 to perform an operation associated with application 104-2 based, at least in part, on the two ports allocated at task 605 of FIG. 6.

At task 705, data-processing system 201 transmits a signal to data-processing system 103-2 to use the two allocated ports for performing the operations of application 104-2

At task 706, data-processing system 103-2 transmits a signal to telecommunications terminal 101-2. In particular, the signal from data-processing system 103-2 to telecommunications terminal 101-2 performs the operation associated with application 104-2, which was requested by application 104-2 at task 704. Thus, data-processing system 103-2 can inject an operation associated with application 104-2 into the connection (i.e., communications channel) between:
  i. telecommunications terminal 101-1 and data-processing system 103-2, or
  ii. telecommunications terminal 101-2 and data-processing system 103-2, or
  iii. a combination of i and ii,
utilizing the two ports allocated by data-processing system 103-2.

In accordance with the illustrative embodiment, the operations performed by application 104-1 are only directed towards telecommunications terminal 101-1, whereas the operations performed by application 104-2 are only directed towards telecommunications terminal 101-2. However, it will be clear to those skilled in the art, after reading this disclosure, how to make and use alternative embodiments of the present invention in which each operation performed by application 104-1 and each operation performed by application 104-2 can be directed towards, for example, and without limitation, both telecommunications terminal 101-1 and telecommunications terminal 101-2.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method of allocating ports in a communication session, wherein a plurality of applications share said communication session, said method comprising:
   receiving at a first data-processing system, DPS1, from a first terminal, T1, associated with a first application, App1, a first request, $Req_1$, for two ports for use by said first terminal;
   transmitting from said first data-processing system, $DPS_1$, to a second data-processing system, $DPS_2$, said first request, $Req_1$;
   transmitting a signal from said second data-processing system, $DPS_2$, to a third data-processing system, $DPS_3$, to allocate two ports;
   at said third data-processing system, $DPS_3$, allocating two ports and transmitting a signal to said second data processing system, $DPS_2$, said signal comprising parameters for said two ports;
   at said second data-processing system, $DPS_2$, allocating a token, associating the token with said parameters for said two ports, and transmitting a signal to said first data-processing system, $DPS_1$, with said token and parameter information;
   at said first data-processing system, $DPS_1$, determining that a second application, $App_2$, is associated with a second terminal, $T_2$, and transmitting a signal to said second application, $App_2$, said signal comprising said token and parameter information;
   utilizing said two ports allocated from said third data processing system, requesting two additional ports; and
   determining that two ports have already been allocated by said third data processing system and reusing said two ports already allocated by said third data processing system to perform an operation by said second application.

2. The method of claim 1 wherein said first data-processing system, $DPS_1$, encapsulates said parameters using said token.

3. The method of claim 1 wherein said second data-processing system, $DPS_2$, is configured to execute an operation associated with said first application, $App_1$, by injecting said operation associated with said first application, $App_1$, into a communications channel between said second data-processing system, $DPS_2$, and said first telecommunications terminal, $T_1$.

4. The method of claim 1 wherein said second data-processing system, $DPS_2$, is configured to execute an operation associated with said first application, $App_1$, by injecting said operation associated with said first application, $App_1$, into:
   i. a first communications channel between said second data-processing system, $DPS_2$, and a first telecommunications terminal, $T_1$; and
   ii. a second communications channel between said second data-processing system, $DPS_2$, and said second telecommunications terminal, $T_2$.

5. The method of claim 1, wherein said token encapsulates a media state of a session in which said parameters associated, said token being enabled to be updated during a span of said session.

* * * * *